(12) United States Patent
Uemura et al.

(10) Patent No.: US 9,048,473 B2
(45) Date of Patent: Jun. 2, 2015

(54) VEHICULAR POWER SOURCE UNIT

(75) Inventors: Takuro Uemura, Wako (JP); Keisuke Fujimaki, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 987 days.

(21) Appl. No.: 12/625,681

(22) Filed: Nov. 25, 2009

(65) Prior Publication Data

US 2010/0129690 A1    May 27, 2010

(30) Foreign Application Priority Data

Nov. 27, 2008   (JP) ................................. 2008-302534

(51) Int. Cl.
*H01M 8/04* (2006.01)
*B60L 11/18* (2006.01)

(52) U.S. Cl.
CPC ......... *H01M 8/04626* (2013.01); *B60L 11/185* (2013.01); *B60L 11/1887* (2013.01); *B60L 11/1892* (2013.01); *B60L 11/1894* (2013.01); *H01M 8/0432* (2013.01); *H01M 8/04604* (2013.01); *H01M 8/04701* (2013.01); *H01M 8/04753* (2013.01); *H01M 8/04888* (2013.01); *H01M 2250/20* (2013.01); *Y02E 60/50* (2013.01); *Y02T 90/128* (2013.01); *Y02T 90/14* (2013.01); *Y02T 90/32* (2013.01); *Y02T 90/34* (2013.01); *Y02T 90/121* (2013.01)

(58) Field of Classification Search
CPC ..................... H01M 8/04626; H01M 8/04701; H01M 8/04888; H01M 8/04753; H01M 2250/20; Y02T 90/14; Y02T 90/34; Y02T 90/32; Y02T 10/7088; B60L 11/1894; B60L 11/1892; B60L 11/185; B60L 11/1887; Y02E 60/50

USPC .............. 429/428, 61, 62, 91, 402, 429, 430, 429/433, 442, 512
See application file for complete search history.

(56) References Cited

U.S. PATENT DOCUMENTS

| | | | |
|---|---|---|---|
| 5,504,416 A | * | 4/1996 | Holloway et al. ............. 320/152 |
| 2004/0214055 A1 | * | 10/2004 | Aoyama et al. ................ 429/19 |
| 2005/0136297 A1 | | 6/2005 | Inai et al. |

(Continued)

FOREIGN PATENT DOCUMENTS

| | | | | |
|---|---|---|---|---|
| FR | 2910181 | * | 6/2008 | ............. H01M 8/04 |
| JP | 2005-317410 | | 11/2005 | |
| WO | 2006085674 A1 | | 8/2006 | |

OTHER PUBLICATIONS

Non-Final Office Action dated Nov. 29, 2012 issued in related U.S. Appl. No. 13/602,683.

*Primary Examiner* — Patrick Ryan
*Assistant Examiner* — Aaron Greso
(74) *Attorney, Agent, or Firm* — Squire Patton Boggs (US) LLP

(57) ABSTRACT

Provided is a vehicular power source unit having an external electric power supply controlling element (94) configured to control the operation of a heater (16) and a recharger (22) operated by an electric power supplied from a commercial power source (70) via an external power source connector (25) according to a terminal voltage and temperature of a fuel cell (10) detected by a fuel cell state detecting element (91) and a state of a battery (20) detected by a battery state detecting element (92) when a fuel cell vehicle is halted, the supply of reactant gas to the fuel cell (10) by a fuel cell controlling element (93) is stopped and the external power source connector (25) is connected to the commercial power source (70).

8 Claims, 5 Drawing Sheets

(56) References Cited

U.S. PATENT DOCUMENTS

| | | | |
|---|---|---|---|
| 2005/0181246 A1* | 8/2005 | Nakaji | 429/13 |
| 2005/0238934 A1* | 10/2005 | Takahashi | 429/24 |
| 2006/0088738 A1* | 4/2006 | Aso | 429/9 |
| 2008/0118797 A1 | 5/2008 | Hirakata | |

* cited by examiner

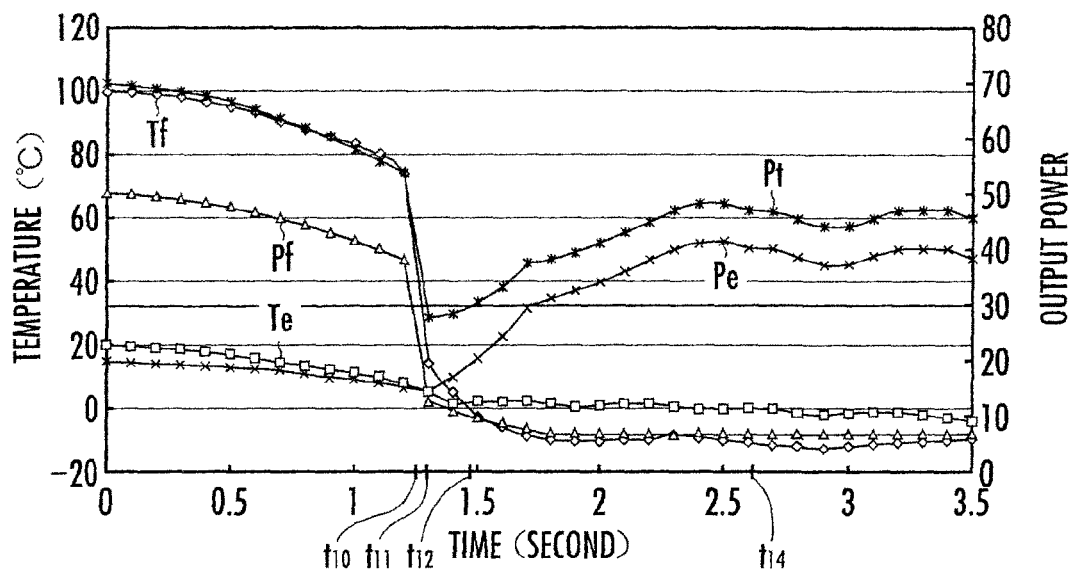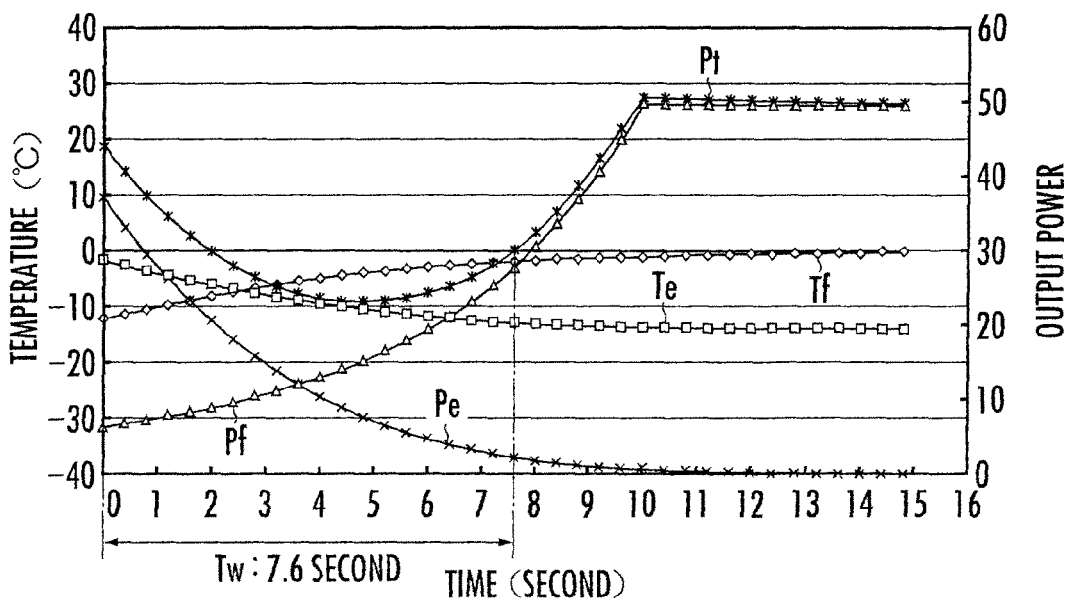

VEHICULAR POWER SOURCE UNIT

BACKGROUND OF THE INVENTION

1. Field of the Invention

The present invention relates to a vehicular power source unit having a fuel cell.

2. Description of the Related Art

Conventionally, there has been known a vehicular power source unit (for example, refer to Japanese Patent Laid-open No. 2005-317410) which is provided with a fuel cell and an auxiliary power source (a battery, a capacitor or the like) and is configured to operate a heater to heat the fuel cell with the electric power supplied from the auxiliary power source at a low temperature.

In the conventional vehicular power source unit, after a given time interval has elapsed from the halt of a vehicle, the hydrogen in the fuel cell is scavenged and power generation from the fuel cell is suspended. In this case, when the hydrogen is supplied to the fuel cell to restart the power generation from the fuel cell, it will take some time to raise the voltage generated from the fuel cell until stable.

Moreover, if the power generation from the fuel cell is restarted at a low temperature, it will take additional time to raise the temperature of the fuel cell to an appropriate temperature. Therefore, the time needed to raise the voltage generated from the fuel cell until stable will become further longer.

If the vehicle is started before the temperature of the fuel cell has been sufficiently raised, the electric current supplied from the fuel cell will become greater, which in turn decrease the voltage generated from the fuel cell drastically. Consequently, the component materials of the fuel cell are deteriorated, which degrades the performance of the fuel cell.

Thus, before the generated voltage from the fuel cell is raised until stable, it is required to assist the fuel cell with electric power supplied from the auxiliary power source to run the vehicle. However, in this case, if an amount of charge of the auxiliary power source is insufficient, the fuel cell may not be sufficiently assisted by the auxiliary power source, which leads to a problem that it will take a longer time for the total power output from the fuel cell and the auxiliary power source to reach a level required to run the vehicle.

SUMMARY OF THE INVENTION

The present invention has been accomplished in view of the aforementioned problems, and it is therefore an object of the present invention to provide a vehicular power source unit capable of shortening a time interval for a total power output from a fuel cell and an auxiliary power source to reach a level required to run a vehicle when the fuel cell is operated to generate electric power to run the vehicle.

To attain an object described above, the present invention provides a vehicular power source unit mounted in a vehicle for supplying electric power to an electric load disposed in the vehicle.

The vehicular power source unit of the present invention is provided with a fuel cell; a fuel cell controlling element configured to control the supply of reactant gas to the fuel cell; an electric accumulator; an external power source connector for detachably connecting to an external power source; a heater operated by the electric power supplied from the external power source via the external power source connector to heat the fuel cell; a recharger operated by the electric power supplied from the external power source via the external power source connector to charge the electric accumulator; a fuel cell state detecting element configured to detect a state of the fuel cell; an electric accumulator state detecting element configured to detect a state of the electric accumulator; and an external electric power supply controlling element configured to control the operation of the heater and the recharger operated by the electric power supplied from the external power source via the external power source connector according to the state of the fuel cell detected by the fuel cell state detecting element and the state of the electric accumulator detected by the electric accumulator state detecting element when the vehicle is halted, the supply of the reactant gas to the fuel cell by the fuel cell controlling element is stopped and the external power source connector is connected to the external power source.

According to the present invention, when the vehicle is halted, the vehicular power source unit can be supplied with electric power from the external power source connected via the external power source connector. Further, the state of the fuel cell is detected by the fuel cell state detecting element and the state of the electric accumulator is detected by the electric accumulator state detecting element.

When the vehicle is halted, the supply of the reactant gas to the fuel cell by the fuel cell controlling element is stopped and the external power source connector is connected to the external power source, the external power source supply controlling element, according to the state of the fuel cell detected by the fuel state detecting element and the state of the electric accumulator detected by the electric accumulator state detecting element, controls the operation of the heater and the recharger powered by the electric power supplied from the external power source via the external power source connector. Accordingly, the electric power supplied from the external power source via the external power source connector can be efficiently allocated for heating the fuel cell and for charging the electric accumulator according to the state of the fuel cell and the electric accumulator.

Heating the fuel cell can make the electric power generated from the fuel cell increase rapidly when the supply of the reactant gas to the fuel cell is initiated. Charging the electric accumulator can offer increased amount of charge in the electric accumulator for future use. Thereby, when the fuel cell is operated to generate electric power to run the vehicle, the electric power generated from the fuel cell can be rapidly increased and the assisting electric power from the electric accumulator can be assured, which makes it possible to shorten a time interval for a total power output from the fuel cell and the electric accumulator to reach a level required to run the vehicle.

The fuel cell controlling element performs a scavenging action which scavenges the reactant gas remained in the fuel cell at a predefined timing after the supply of the reactant gas to the fuel cell is stopped; the fuel cell state detecting element determines whether or not the scavenging action has been performed on the fuel cell and detects the temperature of the fuel cell; and the external electric power supply controlling element prohibits the heating of the fuel cell by the heater and performs the charging of the electric accumulator by the recharger if the scavenging action has not been performed on the fuel cell, and performs the heating of the fuel cell by the heater and the charging of the electric accumulator by the recharger if the scavenging action has been performed on the fuel cell and if the temperature of the fuel cell is equal to or lower than a predefined temperature when the vehicle is halted, the supply of the reactant gas to the fuel cell by the fuel cell controlling element is stopped and the external power source connector is connected to the external power source.

According to the present invention, even though the supply of the reactant gas to the fuel cell is stopped, the heating of the fuel cell with the heater is not required since the fuel cell is generating heat if the scavenging action is not performed. Thereby, the external electric power supply controlling element controls the recharger to charge the electric accumulator.

On the other hand, after the scavenging action has been performed on the fuel cell, the temperature of the fuel cell will decline. In this case, when the temperature of the fuel cell becomes equal to or lower than the predefined temperature, by performing both the heating of the fuel cell with the heater and the charging of the electric accumulator with the recharger, it is expected to prevent the temperature from declining so as to shorten the warming time when the fuel cell is restarted to generate electric power with the electric accumulator being charged meanwhile.

Further, the electric accumulator state detecting element detects a temperature and an amount of charge of the electric accumulator as the state of the electric accumulator; and the external electric power supply controlling element varies a magnitude of a charging current supplied to the electric accumulator from the recharger according to the temperature and the amount of charge of the electric accumulator detected by the electric accumulator state detecting element.

According to the present invention, the charge performance of the electric accumulator varies in accordance with the temperature and the amount of charge thereof. Thereby, the external electric power supply controlling element varies the magnitude of charging current supplied from the recharger to the electric accumulator according to the temperature and the amount of charge of the electric accumulator. Accordingly, the deterioration of the electric accumulator due to excessive current supplied thereto when it is charged can be avoided.

BRIEF DESCRIPTION OF THE DRAWINGS

FIG. 5(a) and FIG. 5(b) are diagrams illustrating state variations of the fuel cell and the battery treated by the external power source supply controlling element when the external power source connector is connected to the commercial power source after a scavenging action has been performed on the fuel cell.

DETAILED DESCRIPTION OF THE PREFERRED EMBODIMENTS

Figure 1:
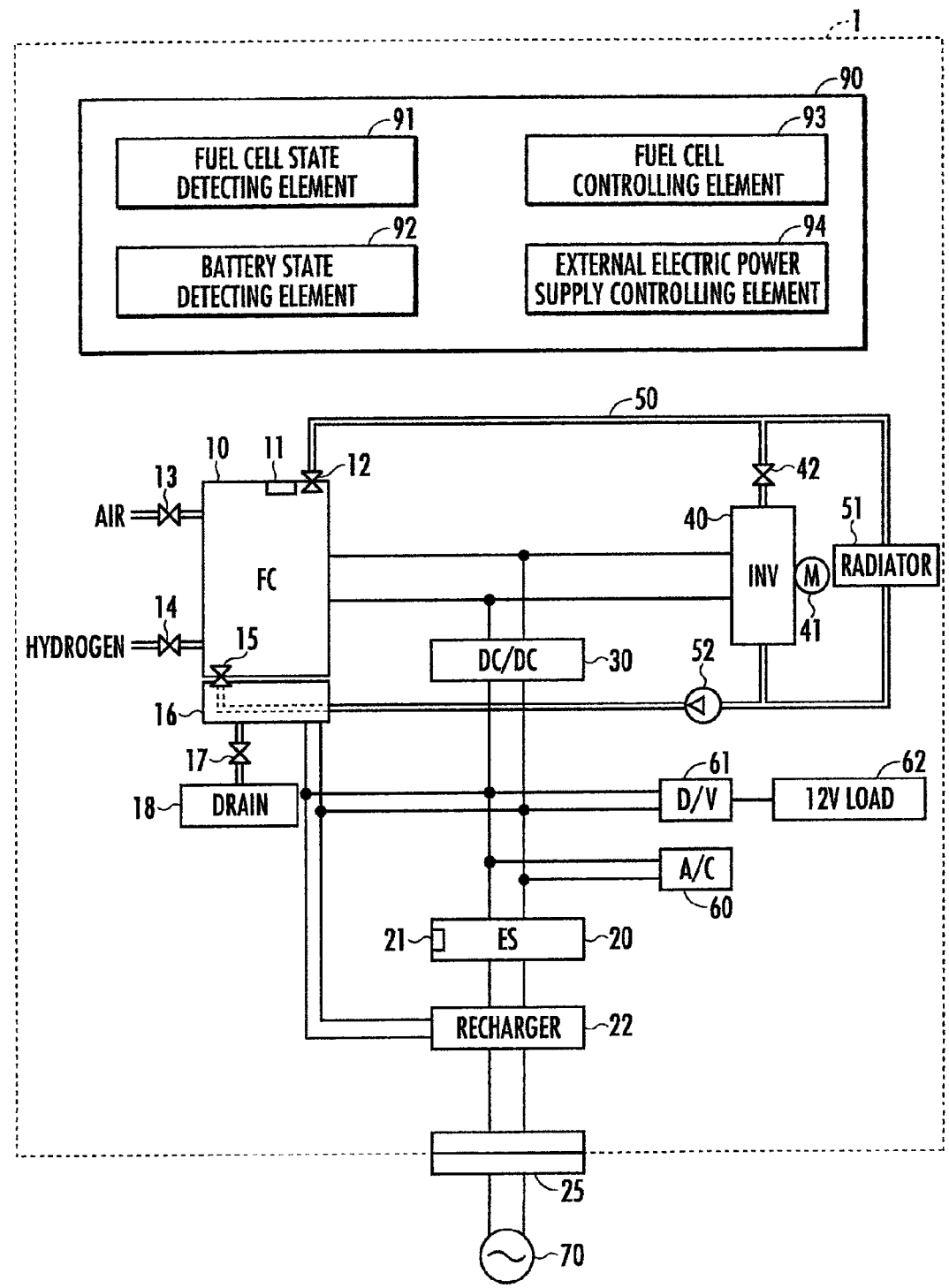
FIG. 1 is an overall configuration diagram of a vehicular power source unit according to an embodiment of the present invention.

Hereinafter, an embodiment of the present invention will be described in detail with reference to FIG. 1 to FIG. 6. FIG. 1 illustrates a configuration diagram of a vehicular power source unit 1 in the present embodiment. The vehicular power source unit 1 is mounted in a fuel cell vehicle (equivalent to a vehicle of the present invention) having driving wheels (not shown) thereof driven by a motor 41.

Referring to FIG. 1, the vehicular power source unit 1 is provided with a fuel cell 10, a battery 20 (equivalent to an electric accumulator of the present invention), a recharger 22 for charging the battery 20, an external power source connector 25 which is detachably connected to a commercial power source (equivalent to an external power source of the present invention), a DC/DC converter 30 connected between the fuel cell 10 and the battery 20, an inverter 40 connected with the fuel cell 10 and the DC/DC converter 30 for outputting electric power to run a motor 41, a coolant circulation circuit 50 connected to a coolant passage between the fuel cell 10 and the inverter 40, a pump 52 circulating coolants in the coolant circulation circuit 50, and a controller 90 controlling the overall operation of the vehicular power source unit 1.

The fuel cell 10 is provided with a fuel cell sensor 11 for detecting a temperature, a terminal voltage, an output current, a supply pressure of reactant gases (in the present embodiment, they are hydrogen and air) and the like of the fuel cell 10, a circulation valve 12 disposed at a connection point between the coolant circulation circuit 50 and the fuel cell 10, an air valve 13 disposed in an air supply pipe, a hydrogen valve 14 disposed in a hydrogen supply pipe, a heater 16, a circulation valve 15 disposed at a connection point between the heater 16 and the fuel cell 10, a drain valve 17 disposed between the fuel cell 10 and a drain pipe of a drain 18.

The battery 20 is provided with a battery sensor 21 for detecting a temperature, a terminal voltage, an output current and the like of the battery 20. The battery 20 is also connected with an air conditioner 60 and a down converter 61 connected with a load of 12V. In the load of 12V, a fuel cell auxiliary device (not shown) for supplying the reactant gases (air and hydrogen) to the fuel cell 10 is included.

The controller 90 is an electronic unit composed of a micro computer (not shown) and the like. By executing a control program for the vehicular power source unit 1 in the micro computer, the controller 90 functions as a fuel cell state detecting element 91, a battery state detecting element 92, a fuel cell controlling element 93, and an external electric power supply controlling element 94.

Detection signals of the temperature, the terminal voltage, the output current, the supply pressure of reactant gases and the like of the fuel cell 10 detected by the fuel cell sensor 11, and detection signals of the temperature, the terminal voltage, the output current and the like of the battery 20 detected by the battery sensor 21 are input into the controller 90. The circulation valves 12, 15 and 42, the air valve 13, the hydrogen valve 14, the heater 16, the drain valve 17, the DC/DC converter 30, the recharger 22, the pump 52, and the fuel cell auxiliary device are controlled according to control signals output from the controller 90.

The fuel cell state detecting element 91, on the basis of the detection signals output from the fuel cell sensor 11, detects the temperature, the terminal voltage, the output current, the supply pressure of reactant gases and the like of the fuel cell 10. As to be described hereinafter, the fuel cell state detecting element 91, on the basis of the terminal voltage of the fuel cell 10, determines whether or not a scavenging action which scavenges hydrogen in the fuel cell 10 has been performed.

The battery state detecting element 92, on the basis of the detection signals output from the battery sensor 21, detects the temperature, the terminal voltage, the output current, the SOC (State of Charge: the percentage of the amount of residual charge of the battery 20 when the amount of charge in the full-charged battery 20 is denoted as 100%) and the like of the battery 20.

The fuel cell controlling element 93 controls the amount of reactant gases supplied to the fuel cell 10 so as to generate a desired electric power from the fuel cell 10. The desired electric power generated from the fuel cell 10 is determined by an ECU (abbreviation of Electric Control Unit, not shown) which controls the overall operation of the fuel cell vehicle. Moreover, the fuel cell controlling element 93 performs the scavenging action to scavenge hydrogen remained in the fuel cell 10 when the supply of reactant gases to the fuel cell 10 is suspended to stop the fuel cell 10 from generating electric power.

When the fuel cell vehicle is halted and the commercial power source 70 is connected to the external power source connector 25, the external electric power supply controlling element 94 allocates the electric power supplied from the commercial power source 70 for charging the battery 20 through the recharger 22 and for operating the heater 16 to heat the fuel cell 10.

Hereinafter, with reference to the flow charts illustrated in FIG. 2 and FIG. 3, respectively, the description will be carried out on the processing performed by the external electric power supply controlling element 94.

Figure 2:
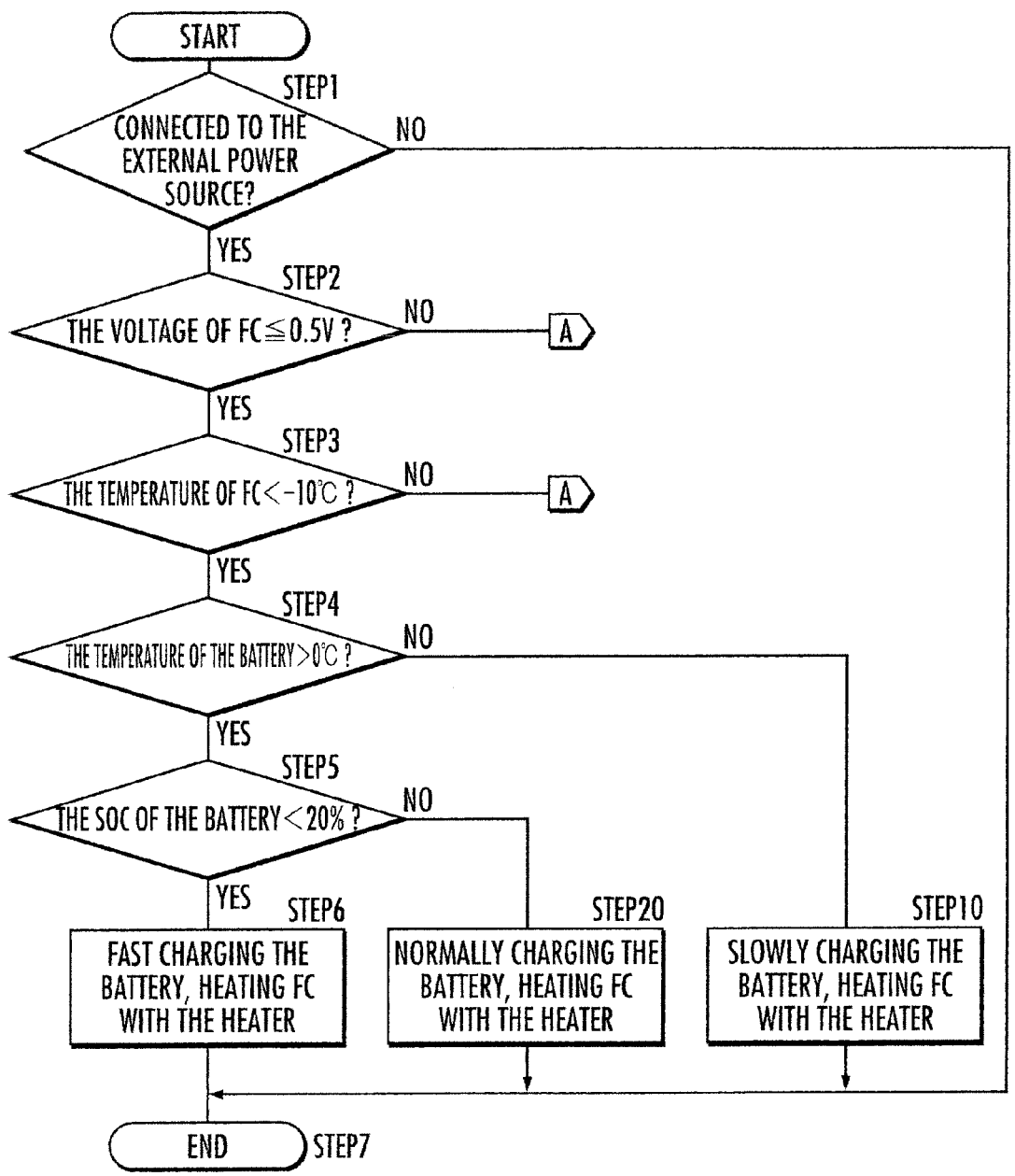
FIG. 2 is a flow chart illustrating a processing order of heating of a fuel cell and charging of a battery with an external power source supply controlling element illustrated in FIG. 1.

In FIG. 2, when the commercial power source 70 is connected to the external power source connector 25 at STEP 1, the process moves to STEP 2 where the external electric power supply controlling element 94 determines whether the terminal voltage of the fuel cell 10 detected by the fuel cell state detecting element 91 is equal to or less than 0.5V or not.

Herein, the terminal voltage of 0.5V is a threshold used to determine whether or not the scavenging action has been performed after the supply of reactant gases to the fuel cell 10 is suspended. If the hydrogen remained in the fuel cell 10 has been scavenged by the scavenging action, the electric power generated by the fuel cell 10 declines; thus, the terminal voltage of the fuel cell 10 will drop to around 0V. Thereby, if the terminal voltage of the fuel cell 10 becomes equal to or less than 0.5V, it can be determined that the scavenging action has been performed.

When the terminal voltage of the fuel cell 10 becomes equal to or less than 0.5V (i.e. the scavenging action has been performed), the process moves to STEP 3 where the external electric power supply controlling element 94 determines whether or not the temperature of the fuel cell 10 is lower than −10° C. (equivalent to a predefined temperature of the present invention). Herein, if the temperature of the fuel cell 10 is lower than −10° C., water produced from the power generation freezes in the supply passage supplying the reactant gases to the fuel cell 10, which deteriorates the power generation performance of the fuel cell 10.

If the temperature of the fuel cell 10 is determined to be lower than −10° C., the process moves to STEP 4. As illustrated in FIG. 2, the processing at STEP 6, STEP 10 and STEP 20, respectively, is configured to heat the coolants in the circulation circuit 50 with the heater 16, supply the heated coolants through the coolant passage of the fuel cell 10 with the pump 52 to warm up the fuel cell 10, and charge the battery 20 at the same time.

At STEP 4, the external electric power supply controlling element 94 determines whether or not the temperature of the battery 20 detected by the battery state detecting element 92 is higher than 0° C. If the temperature of the batter 20 is determined to be higher than 0° C. (without deteriorating the charge performance of the battery 20), the process moves to STEP 5 where the external electric power supply controlling element 94 determines whether or not the SOC of the battery 20 detected by the battery state detecting element 92 is lower than 20%.

At STEP 5, if the SOC of the battery 20 is determined to be lower than 20%, in other words, the discharge performance of the battery 20 is not deteriorated by the low temperature and the amount of charge of the battery 20 is insufficient, the process moves to STEP 6 where the external electric power supply controlling element 94 performs fast charge on the battery 20 with a charging current greater than the normal current flown from the recharger 22 into the battery 20 and initiates the heater 16. Thereby, when the amount of charge of the battery 20 is insufficient, the battery 20 is fast charged, and meanwhile, the fuel cell 10 is heated to prevent the temperature thereof from dropping.

On the other hand, if the SOC of the battery 20 is determined to be equal to or greater than 20% at STEP 5, namely, the discharge performance of the battery 20 is not deteriorated by the low temperature and the amount of charge of the battery 20 is sufficient, the process moves to STEP 20 where the external electric power supply controlling element 94 performs normal charge on the battery 20 through the recharger 22. Thereby, the battery 20 can be prevented from being deteriorated by fast charge performed when the amount of charge is insufficient, and the fuel cell 10 is heated at the same time, which prevents the temperature of the fuel cell 10 from dropping.

Further, at STEP 4, if the temperature of the battery 20 is determined to be equal to or lower than 0° C., namely, the charge performance of the battery 20 has been deteriorated by the low temperature, the process diverges to STEP 10 where the external electric power supply controlling element 94 performs slow charge on the battery 20 with a charging current smaller than the normal current flown from the recharger 22 into the battery 20. Thereby, the fuel cell 10 is heated to prevent the temperature thereof from dropping.

If the terminal voltage of the fuel cell 10 is determined to be equal to or greater than 0.5V at STEP 2, since the scavenging action has not been performed on the fuel cell 10, the fuel cell 10 is generating heat. Therefore, it is not required to heat the fuel cell 10 with the heater 16. Moreover, when the temperature of the fuel cell 10 is determined to be equal to or higher than −10° C. at STEP 3, it is also not required to heat the fuel cell 10 with the heater 16.

Figure 3:
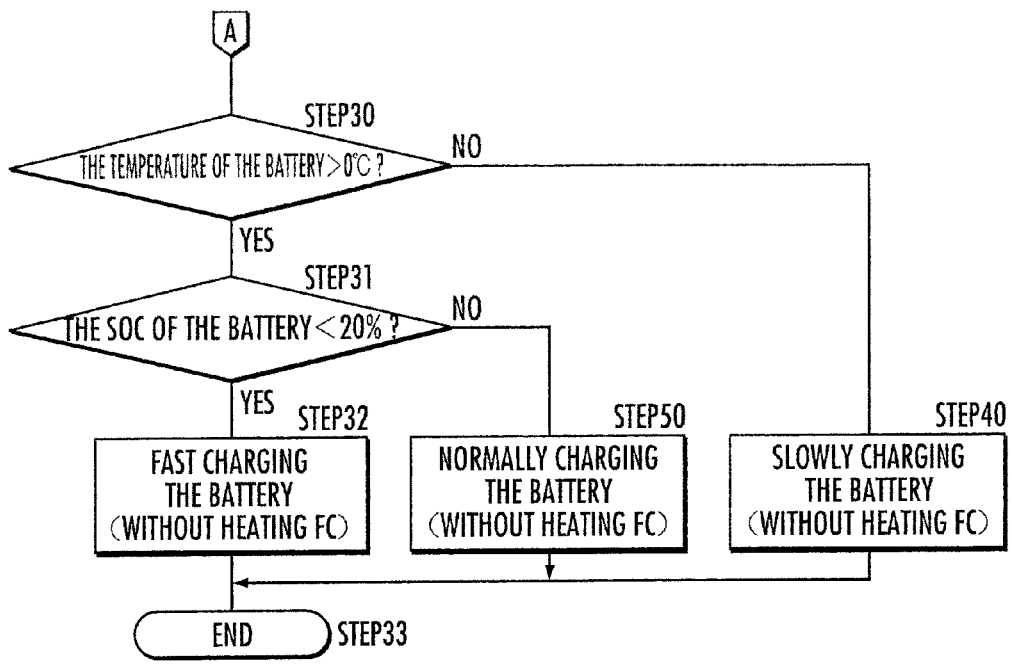
FIG. 3 is a flow chart illustrating a processing order of heating of the fuel cell and charging of the battery with the external power source supply controlling element illustrated in FIG. 1.

Thus, either when the terminal voltage of the fuel cell 10 is equal to or greater than 0.5V at STEP 2 or when the temperature of the fuel cell 10 is equal to or higher than −10° C. at STEP 3, the process diverges to STEP 30 of FIG. 3. The processing at STEP 31, STEP 40 and STEP 50, respectively, is for charging the battery 20 by varying the magnitude of the charging current according to the temperature and the SOC of the battery 20 without heating the fuel cell 10 via the heater 16.

At STEP 30, the external electric power supply controlling element 94 determines whether or not the temperature of the battery 20 is higher than 0° C. If the temperature of the battery 20 is determined to be higher than 0° C., the process moves to STEP 31 where the external electric power supply controlling element 94 determines whether or not the SOC of the battery 20 is less than 20%.

If the SOC of the battery 20 is determined to be less than 20% at STEP 31, namely, when the temperature of the battery 20 is equal to or higher than 0° C. and the SOC of the battery 20 is less than 20%, the process moves to STEP 32 where the external electric power supply controlling element 94 performs fast charge on the battery 20 with a charging current greater than the normal current.

If the SOC of the battery 20 is determined to be equal to or greater than 20% at STEP 31, namely, when the temperature of the battery 20 is equal to or higher than 0° C. and the SOC of the battery 20 is equal to or greater than 20%, the process moves to STEP 50 where the external electric power supply controlling element 94 performs normal charge on the battery 20. Accordingly, the battery 20 is charged.

On the other hand, if the temperature of the battery 20 is determined to be equal to or lower than 0° C. at STEP 30, the process moves to STEP 40 where the external electric power supply controlling element 94 performs slow charge on the battery 20 with a charging current smaller than the normal current. Thereby, the battery 20 with the charge performance thereof degraded due to the low temperature can be charged.

After the battery 20 is charged at STEP 32, STEP 40 or STEP 50, the process moves to STEP 33 where the processing by the external electric power supply controlling element 94 is ended. It should be noted that the external electric power supply controlling element 94 performs the processing illustrated in FIG. 2 and FIG. 3 iteratively if the fuel cell vehicle is halted.

Figure 4:
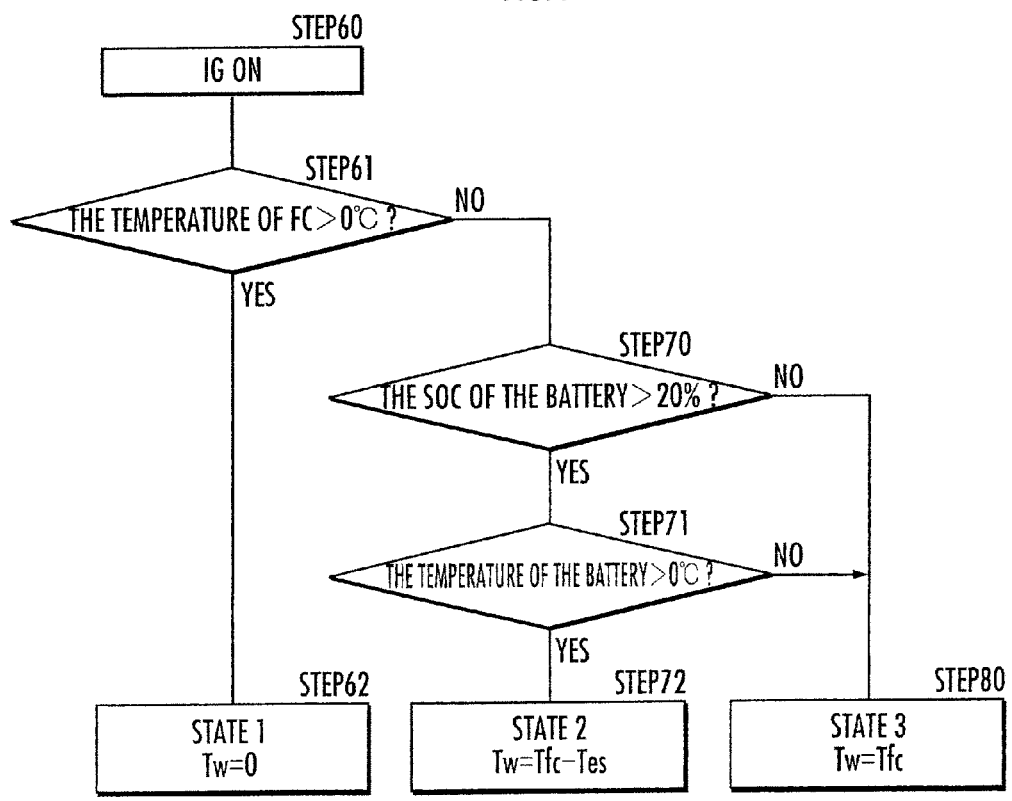
FIG. 4 is a flow chart illustrating processing effects by the external power source supply controlling element.

FIG. 4 is a flow chart illustrating how a waiting time Tw where it is ready for a driver to run the fuel cell vehicle after the driver turns on an ignition of the fuel cell vehicle while the above-mentioned processes in FIG. 2 and FIG. 3 are being performed by the external electric power supply controlling element 94 varies according to the temperature of the fuel cell 10, the SOC of the battery 20, and the temperature of the battery 20.

When the driver turns on the ignition at STEP 60, the supply of the reactant gases to the fuel cell 10 is performed by the fuel cell controlling element 93; however, in prior to this, the above-mentioned processes in FIG. 2 and FIG. 3 have been performed by the external electric power supply controlling element 94. Thereby, the battery 20 is charged while the fuel cell 10 is being heated by the heater 16 in accordance with the temperature of the fuel cell 10.

At STEP 61, if the temperature of the fuel cell 10 is determined to be higher than 0° C., it is possible for the fuel cell 10 to generate more electric power instantly since the fuel cell 10 is not needed to be warmed up. Therefore, the waiting time Tw is zero (state 1).

If the temperature of the fuel cell 10 is determined to be equal to or lower than 0° C. at STEP 61, the process diverges to STEP 70. Further, at STEP 70, if the SOC of the battery 20 is determined to be smaller than 20%, the process diverges to STEP 80 (state 3).

On the contrary, if the SOC of the battery 20 is determined to be greater than 20% at STEP 70, the process moves to STEP 71. If the temperature of the battery 20 is determined to be lower than 0° C., the process moves to STEP 80 (state 3); and if the temperature of the battery 20 is determined to be equal to or higher than 0° C., the process diverges to STEP 72 (state 2).

In the state 2 of STEP 72, since the amount of charge in the battery 20 is sufficient and the temperature of the battery 20 is high (0° C. or higher than 0° C.), the battery 20 can continue to generate electric power in a duration Tes. Therefore, the waiting time Tw=Tfc−Tes.

In the state 3 of STEP 80, either the amount of charge in the battery 20 is less or the temperature of the battery is low, the discharge performance of the battery is degraded, the duration Tes where the battery 20 can continue to generate electric power equals to zero. Moreover, since the temperature of the fuel cell 10 is low (lower than 0° C.), it is required to warm up the fuel cell 10. Therefore, the waiting time Tw equals to the warming time Tfc of the fuel cell 10.

As mention above, when the fuel cell vehicle is halted and the scavenging action has been performed on the fuel cell 10, the state 2 of STEP 72 in FIG. 4 can be achieved through the processes performed by the external electric power supply controlling element 94 according to the flow charts illustrated in FIG. 2 and FIG. 3.

Conventionally, the waiting time Tw in state 3 is equal to Tfc (warming time for the fuel cell) when the ignition is turned on after the scavenging action has been performed on the fuel cell 10. However, according to the present embodiment, the waiting time Tw can be shortened as (Tfc−Tes), namely, the state 2.

Figure 6:
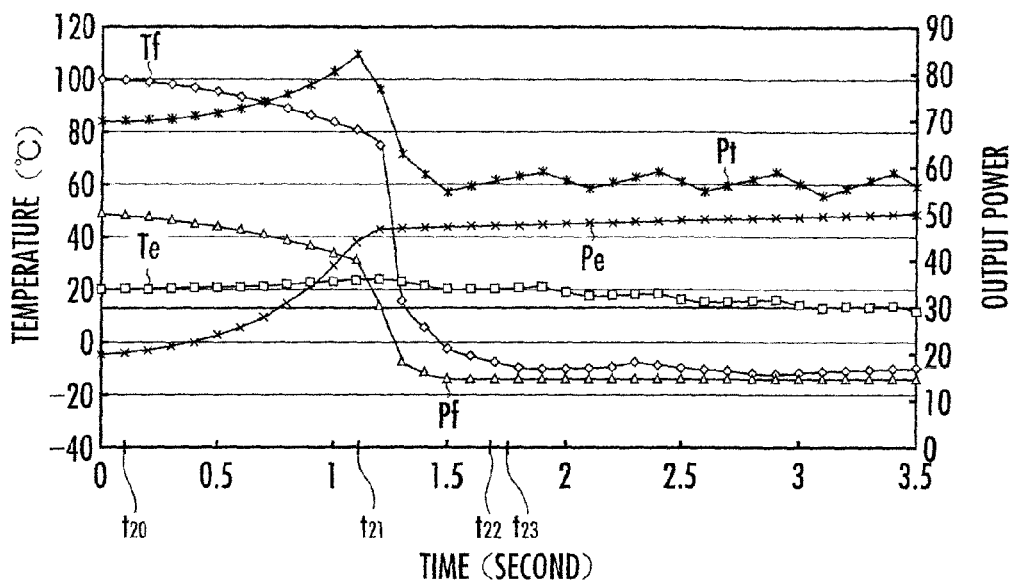
FIG. 6(a) and FIG. 6(b) are diagrams illustrating state variations of the fuel cell and the battery treated by the external power source supply controlling element when the external power source connector is connected to the commercial power source before the scavenging action is performed on the fuel cell.
Figure 6:
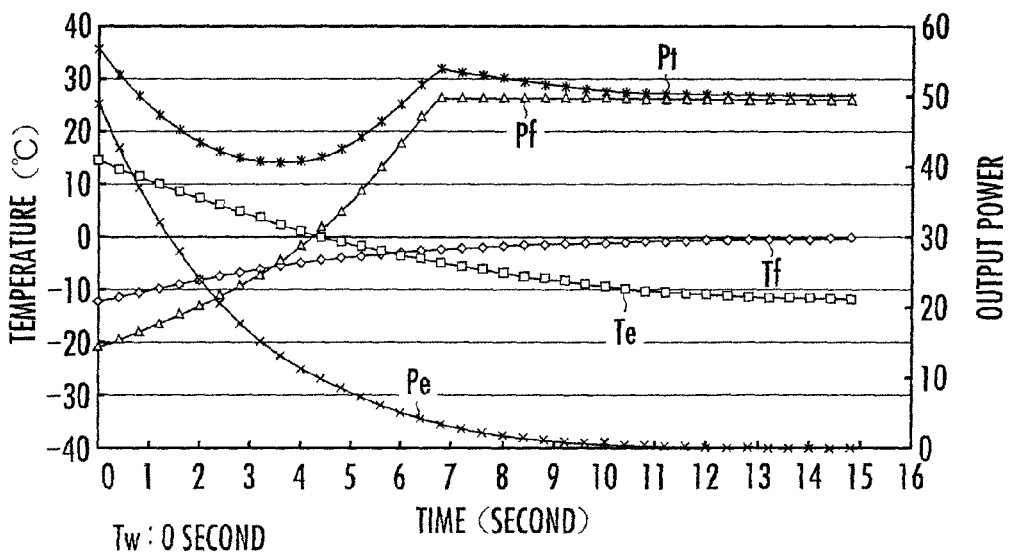

Hereinafter, with reference to FIG. 5($a$), FIG. 5($b$), FIG. 6($a$) and FIG. 6($b$), the description will be carried out on the state variation of the fuel cell 10 and the battery 20 when the ignition is turned on till the total electric power required to run the fuel cell vehicle is obtained from the fuel cell 10 and the battery 20.

The graphs illustrated in FIG. 5($a$) and FIG. 5($b$) illustrate respectively a case where the commercial power source 70 is connected to the external power source connector 25 after the scavenging action has been performed on the fuel cell 10. The vertical axes denote temperature (left side) and output electric power (right side), and the horizontal axis denotes time.

In FIG. 5($a$), $t_{10}$ denotes a time where the scavenging action was performed on the fuel cell 10, $t_{11}$ denotes a time where the normal charge on the battery 20 was started, $t_{12}$ denotes a time where the heating of fuel cell 10 by the heater 16 was started, and $t_{14}$ denotes a time where the slow charge on the battery 20 was initiated.

The state variation of the fuel cell 10 and the battery 20 after the ignition was turned on at Time=3 (sec) as illustrated in FIG. 5($a$) is denoted as the state variation thereof at Time=0 in FIG. 5($b$).

In FIG. 5($a$) and FIG. 5($b$), Tf denotes the temperature of the fuel cell 10, Te denotes the temperature of the battery 20, Pf denotes the output electric power (generated electric power) from the fuel cell 10, Pe denotes the output electric power from the battery 20, and Pt denotes the total electric power (Pt=Pf+Pe) output from the fuel cell 10 and the battery 20.

Referring to FIG. 5($a$), when the supply of reactant gases to the fuel cell 10 is stopped at Time=0, the temperature Tf of the fuel cell 10 and the output electric power Pf thereof fall accordingly. In response, the temperature Te and the output electric power Pe of the battery 20 decrease.

Thereafter, when the scavenging action is performed on the fuel cell 10 at $t_{10}$, the temperature Tf and the output electric power Pf of the fuel cell 10 drastically decrease. Then, at $t_{11}$, the normal charge on the battery 20 is initiated according to STEP 50 of FIG. 3, and at $t_{12}$ where the temperature of the fuel cell 10 became lower than −10° C., the fuel cell 10 is heated by the heater 16 according to STEP 20 of FIG. 2. Thereby, the temperature of the fuel cell 10 is maintained around −10° C. after $t_{12}$.

At $t_{14}$ where the temperature of the battery 20 becomes equal to or lower than 0° C. after the normal charge, the charging of the battery 20 is switched from the normal charge into the slow charge according to STEP 10 in FIG. 2.

Referring to FIG. 5($b$), when the supply of reactant gases to the fuel cell 10 is initiated, the output electric power Pf from the fuel cell 10 drastically increases, and the temperature of the fuel cell 10 increases from around −10° C. to around 0° C. On the other hand, the output electric power from the battery 20 decreases in relation to the increment of the output electric power from the fuel cell 10.

When the total electric power Pt of the output electric power Pf from the fuel cell 10 and the output electric power Pe from the battery 20 reaches the value sufficient to run the fuel cell vehicle, for example, 30 (kW), the waiting time Tw is 7.6 seconds.

On the other hand, if the processes in FIG. 2 and FIG. 3 were not performed by the external electric power supply controlling element 94, when the ignition is turned on at the condition where the SOC of the battery 20 is equal to or smaller than 20% and the temperature of the fuel cell 10 is lower than −10° C., the fuel cell 10 must be heated, which corresponds to the state 3 of STEP 80 illustrated in FIG. 4. Therefore, the waiting time Tw becomes equal to or greater than, for example, 13 seconds.

The graphs illustrated in FIG. 6(a) and FIG. 6(b) illustrate respectively a case where the commercial power source 70 is connected to the external power source connector 25 before the scavenging action is performed on the fuel cell 10. Similar to FIG. 5(a) and FIG. 5(b), the vertical axes denote temperature (left side) and output electric power (right side), and the horizontal axis denotes time.

In FIG. 6(a) and FIG. 6(b), Tf denotes the temperature of the fuel cell 10, Te denotes the temperature of the battery 20, Pf denotes the output electric power (generated electric power) from the fuel cell 10, Pe denotes the output electric power from the battery 20, and Pt denotes the total electric power (Pt=Pf+Pe) output from the fuel cell 10 and the battery 20.

In FIG. 6(a), $t_{20}$ denotes a time where the slow charge on the fuel cell 10 is started after the commercial power source 70 is connected to the external power source connector 25, $t_{21}$ denotes a time where the scavenging action was performed on the fuel cell 10, $t_{22}$ denotes a time where the heating of fuel cell 10 by the heater 16 was started, and $t_{23}$ denotes a time where the slow charge on the battery 20 was initiated. The state variation of the fuel cell 10 and the battery 20 after the ignition was turned on at Time=3 (sec) as illustrated in FIG. 6(a) is denoted as the state variation thereof at Time=0 in FIG. 6(b).

Referring to FIG. 6(a), when the supply of reactant gases to the fuel cell 10 is stopped at Time=0, the temperature Tf of the fuel cell 10 and the output electric power Pf thereof fall accordingly. On the contrary, the output electric power Pe of the battery 20 increases in response to the initiation of fast charge on the battery 20 according to STEP 32 of FIG. 3 at $t_{20}$, and the temperature Te of the battery 20 is stable around 20° C.

Thereafter, when the scavenging action is performed on the fuel cell 10 at $t_{21}$, the temperature Tf and the output electric power Pf of the fuel cell 10 drastically decrease. Then, at $t_{22}$ where the temperature of the fuel cell 10 became lower than −10° C., the fuel cell 10 is heated by the heater 16 according to STEP 20 of FIG. 2. Thereby, the temperature of the fuel cell 10 is maintained around −10° C. after $t_{22}$.

At $t_{23}$ where the SOC of the battery 20 becomes equal to or greater than 20%, the charging of the battery 20 is switched from the fast charge into the normal charge according to STEP 10 in FIG. 2.

With reference to FIG. 6(b), since the total electric power Pt of the output electric power Pf from the fuel cell 10 and the output electric power Pe from the battery 20 surpasses the value sufficient to run the fuel cell vehicle, for example, (kW), the waiting time Tw becomes zero second.

As described above with reference to FIG. 5(a), FIG. 5(b), FIG. 6(a) and FIG. 6(b), according to the processes performed in the flow charts illustrated in FIG. 2 and FIG. 3, respectively, the waiting time Tw for obtaining the necessary electric power to run the fuel cell vehicle after the ignition is turned on can be shortened.

In the present embodiment, the terminal voltage and the temperature of the fuel cell 10 are detected by the fuel cell state detecting element 91, and the external electric power supply controlling element 94 determines whether to heat the fuel cell 10 with the heater 16 or not on the basis of the terminal voltage and the temperature of the fuel cell 10. However, it is acceptable to determine whether or not to heat the fuel cell 10 with the heater 16 on the basis of either the terminal voltage of the fuel cell 10 only or the temperature of the fuel cell 10 only.

In the present embodiment, the fuel cell state detecting element 91 determines whether the scavenging action has been performed on the fuel cell 10 or not according to the terminal voltage of the fuel cell 10. However, if information related to the execution of the scavenging action is transmitted between the fuel cell state detecting element 91 and the fuel cell controlling element 93, it is acceptable for the fuel cell state detecting element 91 to determine whether the scavenging action has been performed on the fuel cell 10 or not according to the information.

Further, in the present embodiment, the SOC and the temperature of the battery 20 are detected by the battery state detecting element 92, and the external electric power supply controlling element 94 switches modes among the fast charge, the normal charge and the slow charge to charge the battery 20 according to SOC and the temperature of the battery 20; however, the mode switching may be performed on the basis of either the SOC of the battery 20 only or the temperature of the battery 20 only.

Furthermore, in the present embodiment, the battery 20 is denoted as the electric accumulator of the present invention; however, it is acceptable to use a capacitor as the electric accumulator.

We claim:

1. A vehicular power source unit mounted in a vehicle for supplying electric power to an electric load disposed in the vehicle, comprising:
   a fuel cell;
   a fuel cell controlling element configured to control a supply of reactant gas to the fuel cell;
   an electric accumulator;
   an external power source connector for detachably connecting to an external power source;
   a heater operated by the electric power supplied from the external power source via the external power source connector to heat the fuel cell;
   a recharger operated by the electric power supplied from the external power source via the external power source connector to charge the electric accumulator;
   a fuel cell state detecting element configured to detect a state of the fuel cell;
   an electric accumulator state detecting element configured to detect a state of the electric accumulator; and
   an external electric power supply controlling element configured to control the operation of the heater and the recharger operated by the electric power supplied from the external power source via the external power source connector according to the state of the fuel cell detected by the fuel cell state detecting element and the state of the electric accumulator detected by the electric accumulator state detecting element when the vehicle is halted, the supply of the reactant gas to the fuel cell by the fuel cell controlling element is stopped and the external power source connector is connected to the external power source, wherein the fuel cell controlling element performs a scavenging action which scavenges the reactant gas remaining in the fuel cell at a predefined timing after the supply of the reactant gas to the fuel cell is stopped, wherein the fuel cell state detecting element determines whether or not the scavenging action has been performed on the fuel cell and detects a temperature of the fuel cell, wherein the external electric power supply controlling element distributes the electric power supplied from the external power source via the electric power source connector to the heater and the recharger according to the state of the fuel cell and the state of the electric accumulator, and wherein, when the vehicle is halted, the supply of the reactant gas to the fuel cell by the fuel cell controlling element is stopped, and the external power source connector is connected to the external power source, the external electric power supply controlling element prohibits the heating of the fuel cell by the heater and performs the charging of the electric accumulator by the recharger if the scavenging action has not been performed on the fuel cell when the external power source is connected to the external power source connector, and performs the heating of the fuel cell by the heater and the charging of the electric accumulator by the recharger if the scavenging action has been already performed on the fuel cell and if the temperature of the fuel cell is equal to or lower than a predefined temperature when the external power source is connected to the external power source connector.

2. The vehicular power source unit according to claim 1, wherein the electric accumulator state detecting element detects a temperature and an amount of charge of the electric accumulator as the state of the electric accumulator; and the external electrical power supply controlling element varies a magnitude of a charging current supplied to the electric accumulator from the recharger according to the temperature and the amount of charge of the electric accumulator detected by the electric accumulator state detecting element.

3. The vehicular power source unit according to claim 1, wherein the electric accumulator state detecting element detects a temperature and an amount of charge of the electric accumulator as the state of the electric accumulator; and the external electric power supply controlling element varies a magnitude of a charging current supplied to the electric accumulator from the recharger according to the temperature and the amount of charge of the electric accumulator detected by the electric accumulator state detecting element.

4. A vehicular power source unit for a vehicle, said vehicular power source unit comprising:

a heater configured to be connected to an external power source, and configured to heat a fuel cell;

a recharger configured to be connected to the external power source, and configured to charge an electric accumulator;

an external electric power controlling element configured to control operation of the heater and the recharger according to a state of the fuel cell and a state of the electric accumulator when a vehicle is stopped, when a supply of a reactant gas to the fuel cell stopped, and wherein an external power source connector is connected to the external power source;

a fuel cell controlling element configured to perform a scavenging action which scavenges the reactant gas remaining in the fuel cell at a predefined timing after the supply of the reactant gas to the fuel cell is stopped; and a fuel cell state detecting element configured to determine whether or not the scavenging action has been performed on the fuel cell and to detect a temperature of the fuel cell, wherein the external electric power supply controlling element is configured to distribute the electric power supplied from the external power source via the electric power source connector to the heater and the recharger according to the state of the fuel cell and the state of the electric accumulator, and wherein, when the vehicle is halted, the supply of the reactant gas to the fuel cell by the fuel cell controlling element is stopped, and the external power source connector is connected to the external power source, the external electric power supply controlling element is configured to prohibit the heating of the fuel cell by the heater and to perform the charging of the electric accumulator by the recharger if the scavenging action has not been performed on the fuel cell when the external power source is connected to the external power source connector, and to perform the heating of the fuel cell by the heater and the charging of the electric accumulator by the recharger if the scavenging action has been already performed on the fuel cell and if the temperature of the fuel cell is equal to or lower than a predefined temperature when the external power source is connected to the external power source connector.

5. The vehicular power source unit according to claim 1, wherein the vehicular power source unit is configured to provide a waiting time from a time of ignition to a running time for the vehicle that is less than a warming time for the fuel cell, when the temperature of the fuel cell is below a threshold.

6. The vehicular power source unit according to claim 1, wherein the fuel cell state detecting element comprises an element configured to detect a terminal voltage of the fuel cell, and wherein the fuel cell state detecting element is configured to determine whether or not the scavenging action of the fuel cell has been performed according to whether or not the terminal voltage of the fuel cell is equal to or less than a threshold value.

7. The vehicular power source unit according to claim 6, wherein the threshold value is 0.5 volts.

8. The vehicular power source unit according to claim 3, wherein the external electric power supply controlling element is configured to control:

the charging current supplied to the electric accumulator from the recharger to a first value, when the temperature of the electric accumulator is higher than a predetermined temperature and the amount of charge of the electric accumulator is less than a predetermined amount, the charging current supplied to the electric accumulator from the recharger to a second value which is smaller than the first value, when the temperature of the electric accumulator is higher than the predetermined temperature and the amount of charge of the electric accumulator is equal to or more than the predetermined amount, and the charging current supplied to the electric accumulator from the recharger to a third value which is smaller than the second value, when the temperature of the electric accumulator is lower than the predetermined temperature.

* * * * *